United States Patent
Fukushima et al.

(10) Patent No.: US 10,209,837 B2
(45) Date of Patent: Feb. 19, 2019

(54) DISPLAY DEVICE

(71) Applicant: Japan Display Inc., Minato-ku (JP)

(72) Inventors: Toshiaki Fukushima, Tokyo (JP);
Hiroshi Mizuhashi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 443 days.

(21) Appl. No.: 15/141,079

(22) Filed: Apr. 28, 2016

(65) Prior Publication Data

US 2016/0349881 A1    Dec. 1, 2016

(30) Foreign Application Priority Data

May 29, 2015    (JP) ................................ 2015-110142

(51) Int. Cl.
*G06F 3/044* (2006.01)
*G06F 3/041* (2006.01)
*G09G 3/36* (2006.01)

(52) U.S. Cl.
CPC ............ *G06F 3/044* (2013.01); *G06F 3/0412* (2013.01); *G06F 3/0416* (2013.01); *G09G 3/3611* (2013.01); *G09G 2300/0426* (2013.01); *G09G 2310/0281* (2013.01)

(58) Field of Classification Search
None
See application file for complete search history.

(56) References Cited

U.S. PATENT DOCUMENTS

| 2005/0207249 A1* | 9/2005 | Morita ................. G09G 3/3233 365/203 |
| 2012/0044167 A1* | 2/2012 | Nakanishi ............. G06F 3/0412 345/173 |
| 2012/0262387 A1* | 10/2012 | Mizuhashi ............ G06F 3/0412 345/173 |
| 2014/0192019 A1 | 7/2014 | Fukushima |
| 2015/0022494 A1 | 1/2015 | Azumi et al. |

FOREIGN PATENT DOCUMENTS

| CN | 103927047 A | 7/2014 |
| JP | 2014-149816 | 8/2014 |

OTHER PUBLICATIONS

Office Action dated Jul. 13, 2018, issued in corresponding Chinese Patent Application No. 201610341628.7 (with English-language translation).

* cited by examiner

*Primary Examiner* — Nicholas Lee
(74) *Attorney, Agent, or Firm* — Oblon, McClelland, Maier & Neustadt, L.L.P.

(57) ABSTRACT

According to one embodiment, a display device comprises pixel electrodes formed in a display area, drive electrodes opposed to the pixel electrodes, first and second line groups formed in a non-display area, a first switch configured to apply a voltage for display or a drive signal to the drive electrodes, and a scanner configured to control the first switch. In the above structure, the first and second line groups are disposed with a space between the first line group and the second line group, and at least a part of the scanner is disposed in the space between the first line group and the second line group.

20 Claims, 15 Drawing Sheets

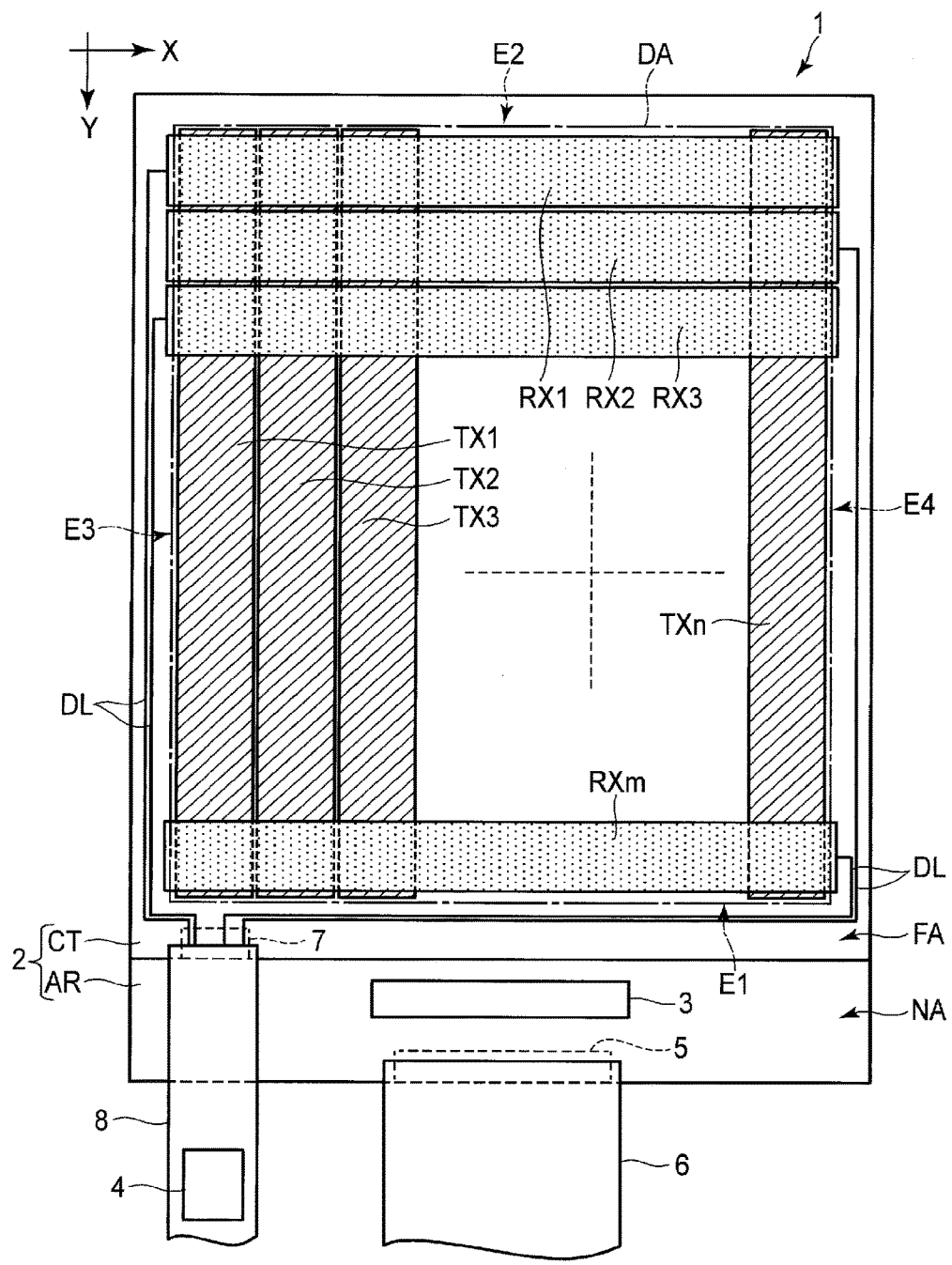
F I G. 1

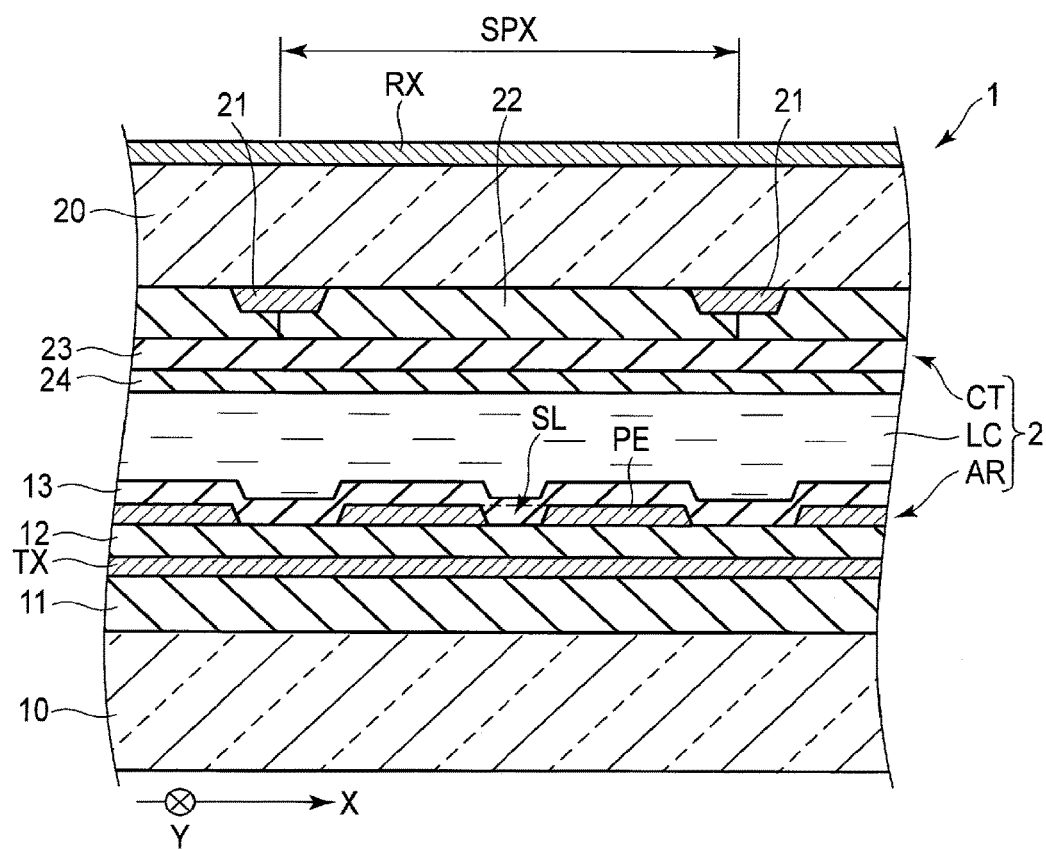
F I G. 2

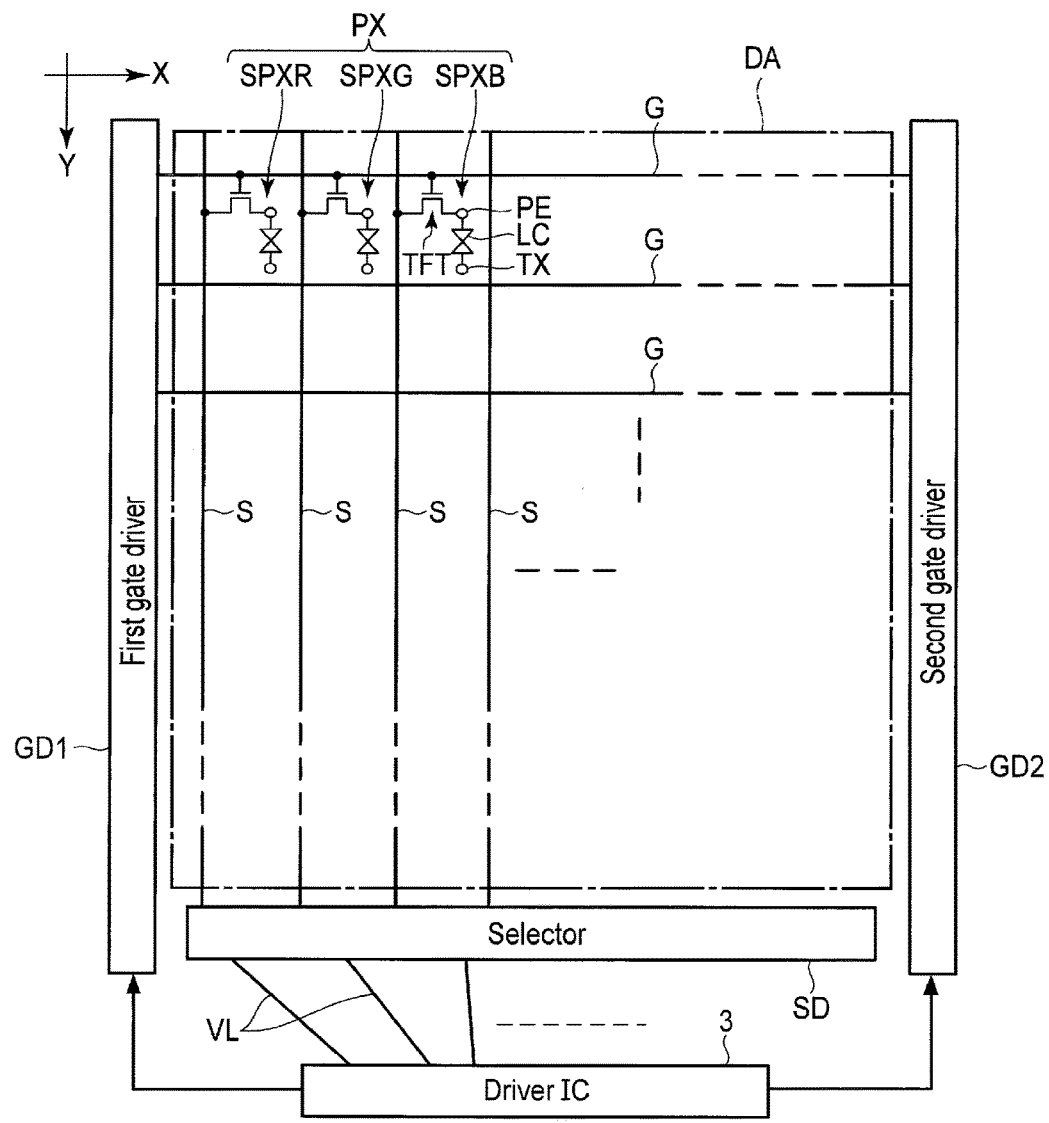
F I G. 4

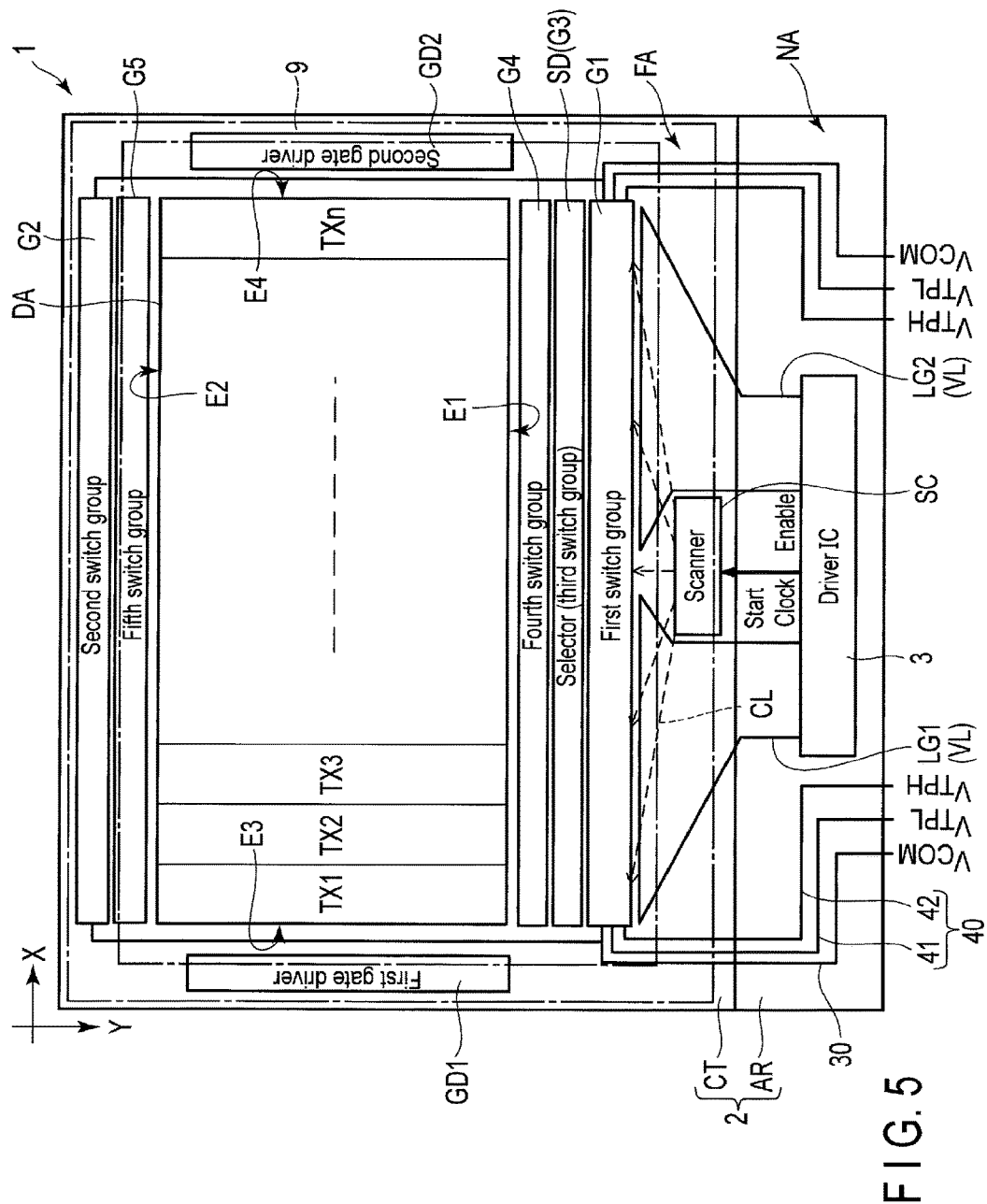
F I G. 5

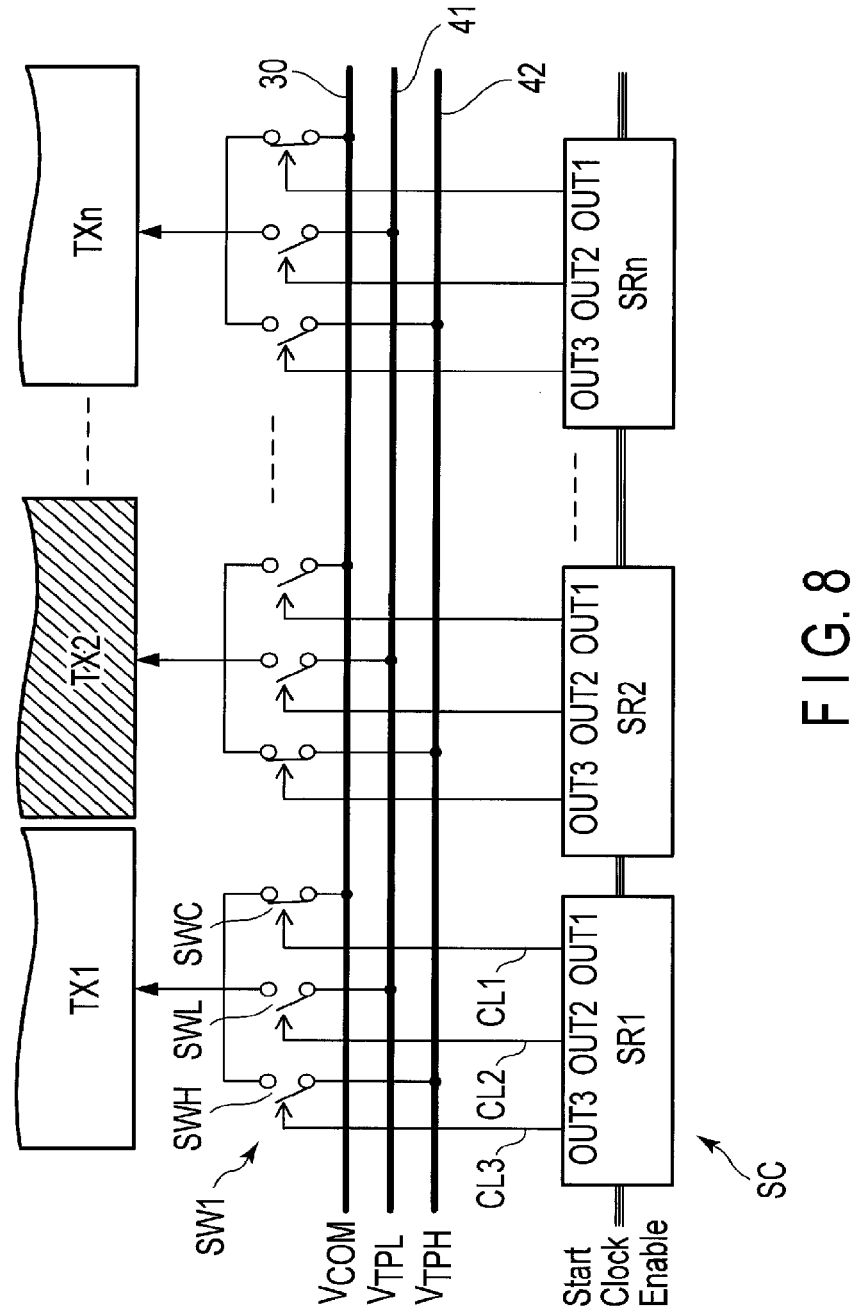
F I G. 8

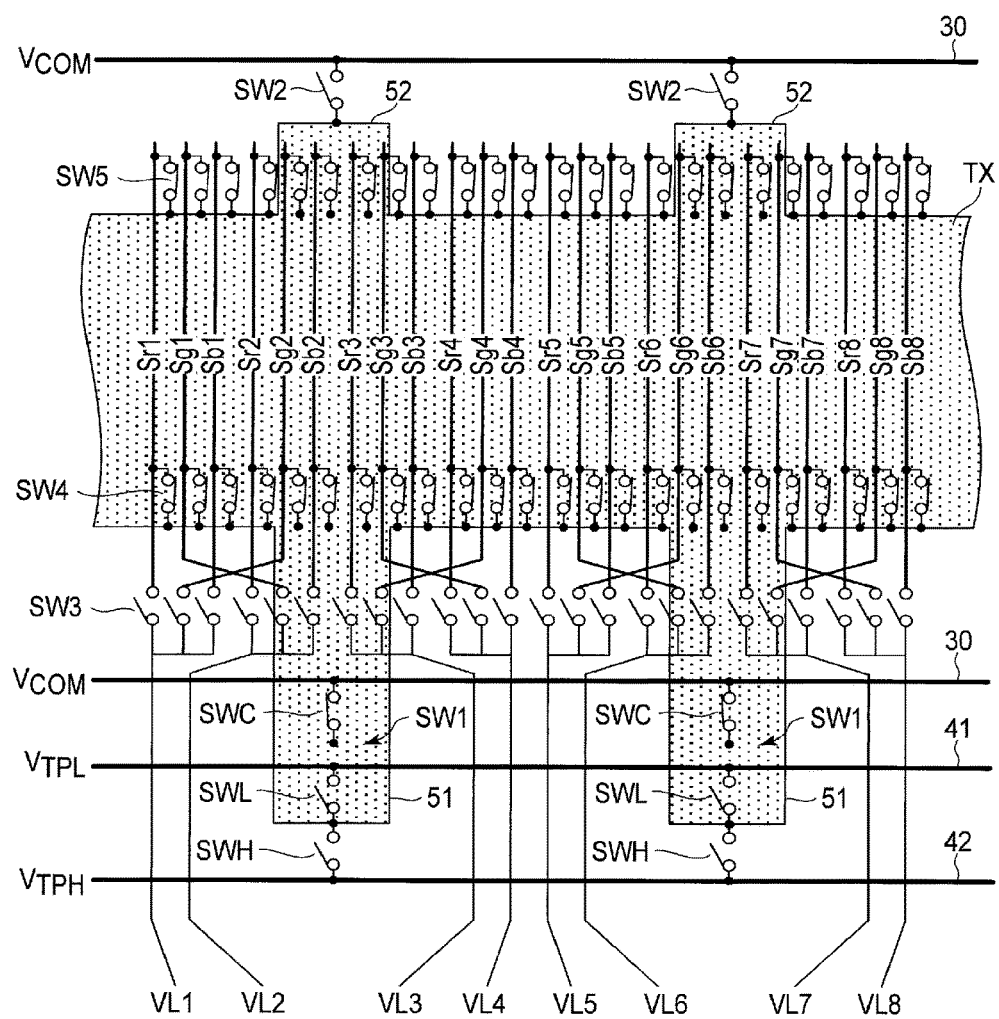
F I G. 9

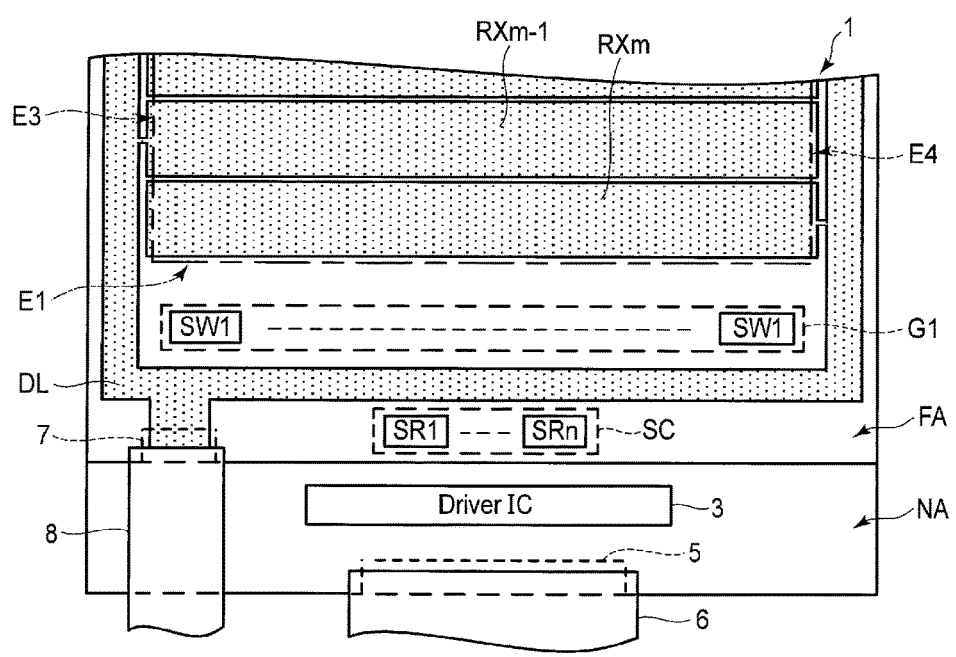
F I G. 10

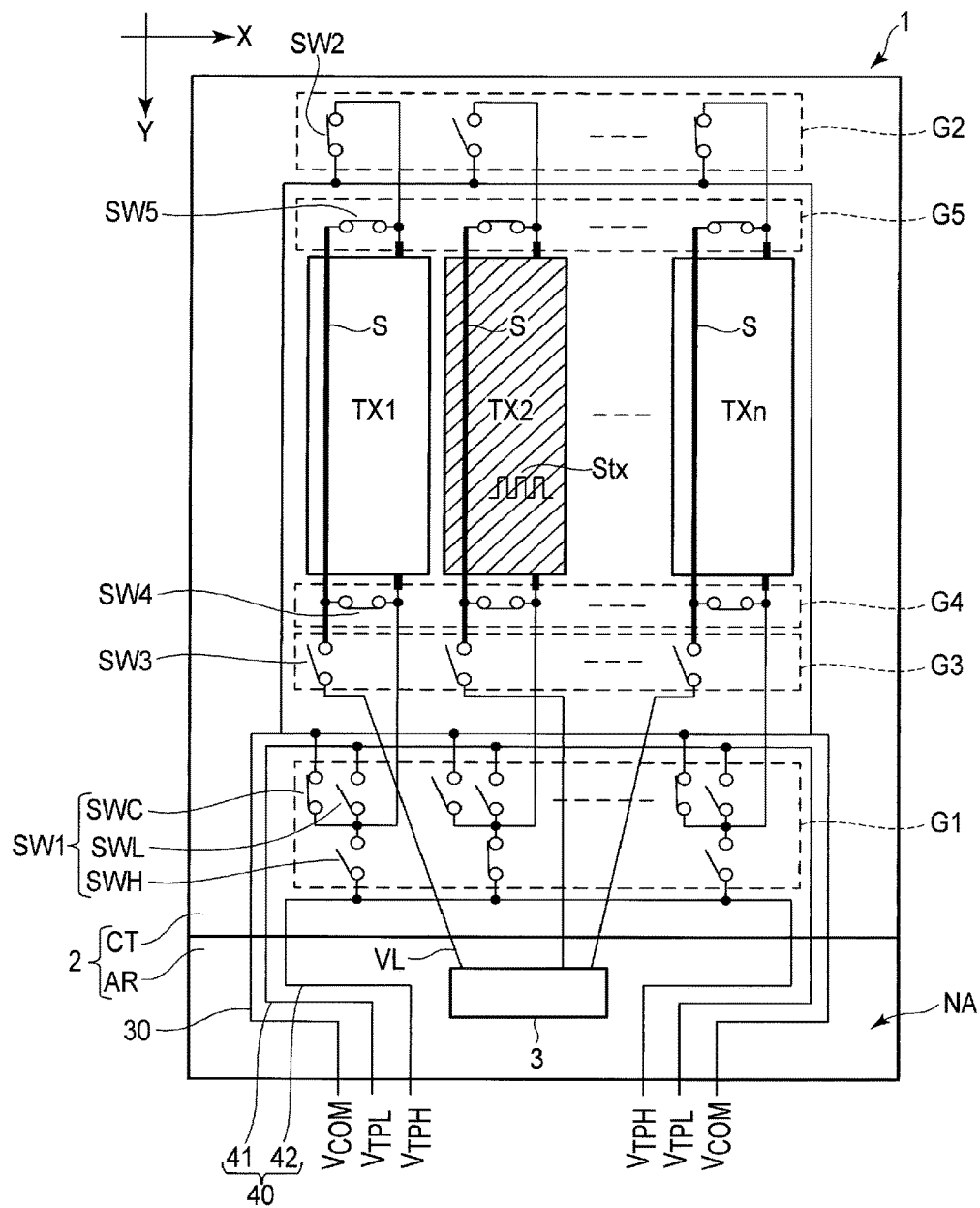
F I G. 14

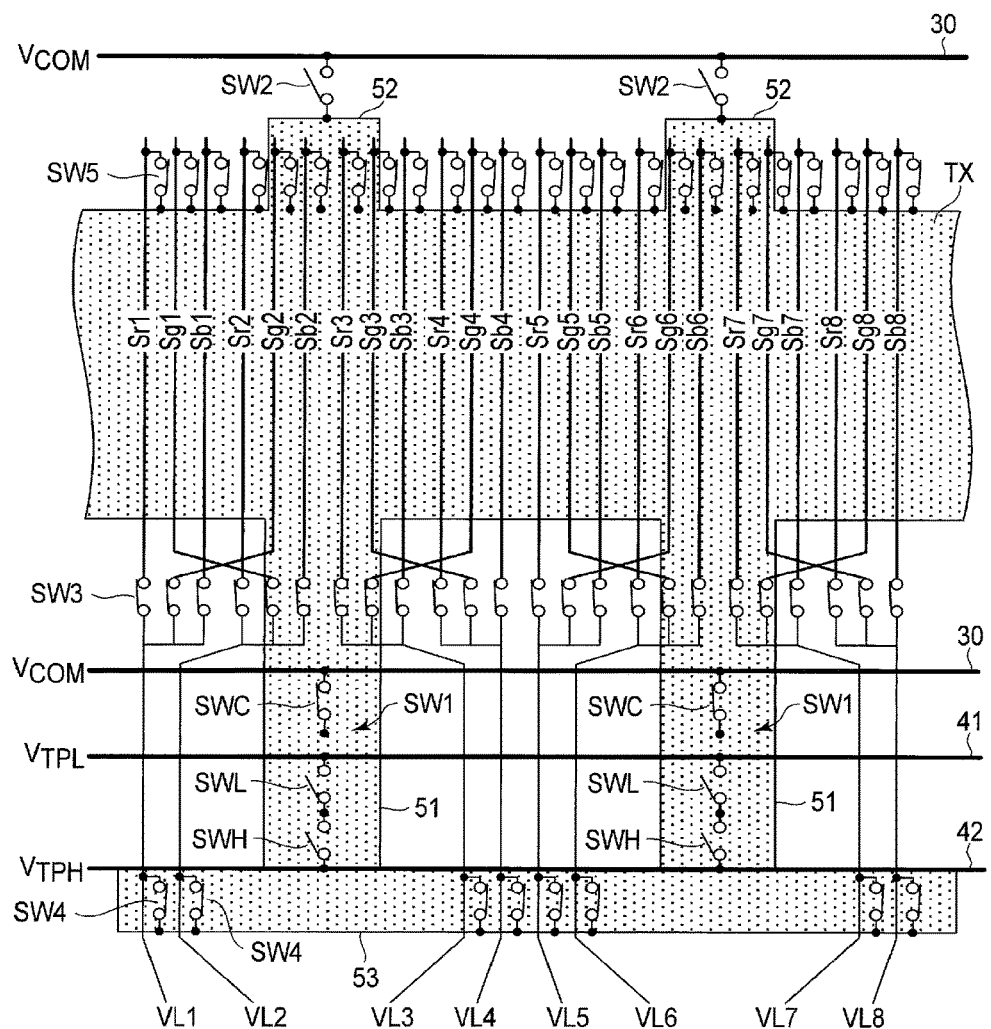
F I G. 15

DISPLAY DEVICE

CROSS-REFERENCE TO RELATED APPLICATIONS

This application is based upon and claims the benefit of priority from Japanese Patent Application No. 2015-110142, filed May 29, 2015, the entire contents of which are incorporated herein by reference.

FIELD

Embodiments described herein relate generally to a display device.

BACKGROUND

In recent years, display devices equipped with a touch detection function of detecting a finger, etc., in contact with or in proximity to a display area have been used for various electronic apparatuses. As this type of display device, for example, a display device which displays an image in a display area, applying a voltage for display between a drive electrode and a pixel electrode provided in the display area, and detects a position of an object in proximity to the display area based on a detection signal from a detection electrode forming electrostatic capacitance between the detection electrode and the drive electrode is known.

In general, in this type of display device, drive electrodes are arranged in a direction from a terminal area of a display panel where a terminal for external connection is provided to a counter-terminal area on the opposite side, and each of the drive electrodes extends in a direction crossing the direction.

On the other hand, as a mode of the drive electrodes, for example, a structure in which each of the drive electrodes extends in the direction from the terminal area to the counter-terminal area and is arranged in the direction crossing the direction can also be adopted. In this case, peripheral circuits and lines for image display and touch detection differ from those of the above liquid crystal display device. Therefore, new devices for circuit arrangement are necessary in terms of the narrowing of a frame, that is, the narrowing of the so-called frame area around a display area, the prevention of a decrease in the accuracy of touch detection due to the incorporation of coupling noise into a detection signal output from a detection electrode at the time of touch detection, etc.

BRIEF DESCRIPTION OF THE DRAWINGS

FIG. 1 is a plan view showing a schematic structure of a display device according to a first embodiment.

FIG. 2 is a diagram schematically showing an example of a section of the display device according to the first embodiment.

FIG. 4 is a diagram showing a schematic equivalent circuit related to image display in the display device according to the first embodiment.

FIG. 5 is a diagram schematically showing elements necessary for image display and touch detection, etc., in the display device according to the first embodiment.

FIG. 8 is a diagram showing an example of a schematic structure of a scanner of the display device according to the first embodiment.

FIG. 9 is a diagram showing a concrete arrangement example of each switch group of the display device according to the first embodiment.

FIG. 10 is a diagram schematically showing a relationship between a detection line, the scanner, a first switch group, etc., of the display device according to the first embodiment.

FIG. 14 is a diagram showing a state in a touch detection period of each switch group of the display device according to the third embodiment.

FIG. 15 is a diagram showing a concrete arrangement example of each switch group of a display device according to a fourth embodiment.

DETAILED DESCRIPTION

Figure 3:
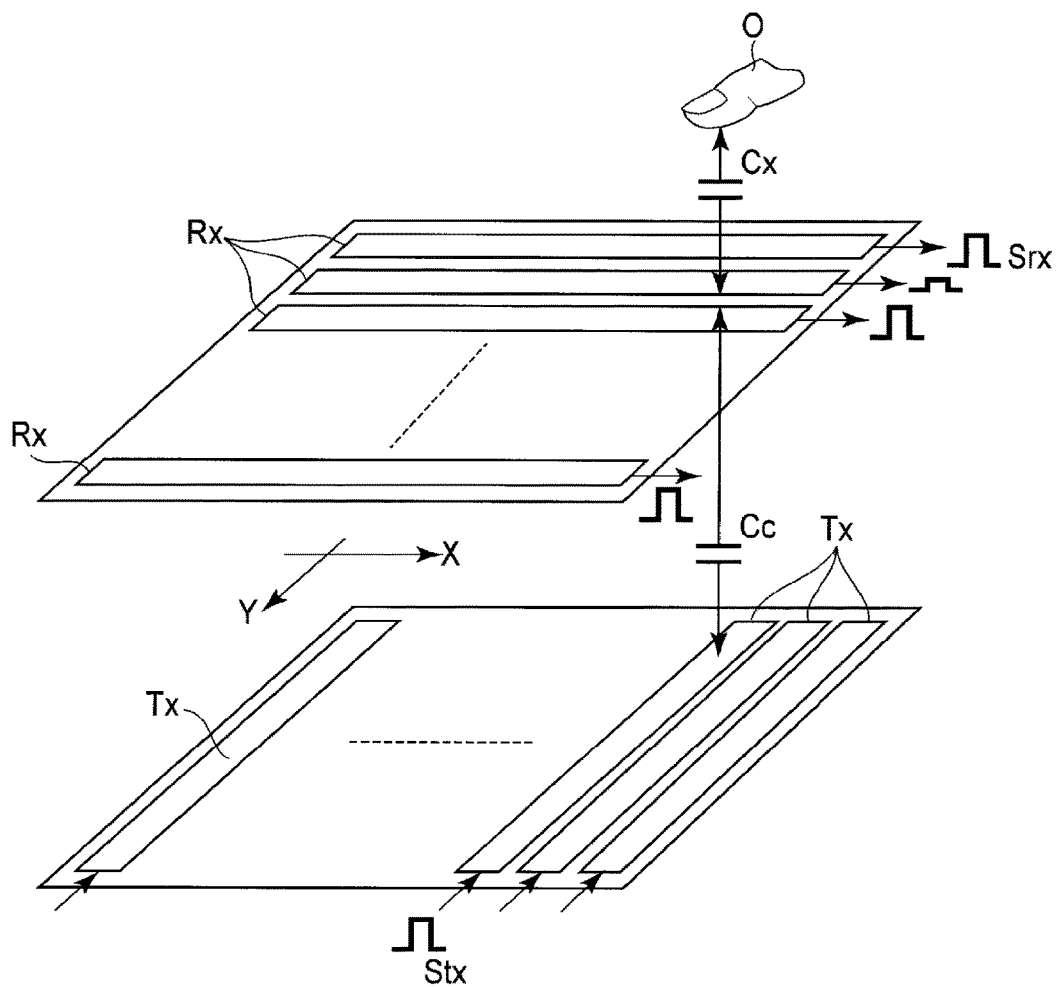
FIG. 3 is a diagram showing an example of a principle according to which an object in contact with or in proximity to a display area is detected.

In general, according to one embodiment, a display device comprises pixel electrodes, drive electrodes, a first line group, a second line group, a first switch, and a scanner. The pixel electrodes are formed in a display area. The drive electrodes are opposed to the pixel electrodes. The first line group and the second line group are formed in a non-display area outside the display area, and configured to transmit a video signal supplied to the pixel electrodes. The first switch is configured to apply a predetermined voltage for image display or a drive signal for detecting an object in contact with or in proximity to the display area to each of the drive electrodes. The scanner is configured to control the first switch. In the above structure, the first line group and the second line group are disposed with a space between the first line group and the second line group, and at least a part of the scanner is disposed in the space between the first line group and the second line group.

According to the display device, a frame of a display panel can be made narrower, or the accuracy of touch detection can be improved.

Embodiments will be described hereinafter with reference to the accompanying drawings.

The disclosure is merely an example, and proper changes within the spirit of the invention, which are easily conceivable by a skilled person, are included in the scope of the present invention as a matter of course. In addition, in some cases, in order to make the description clearer, the drawings may be more schematic than in the actual modes, but they are mere examples, and do not limit the interpretation of the present invention. In the drawings, the reference numbers of the same or similar elements that are successively arranged may be omitted. In the specification and the drawings, structural elements performing the same functions as or similar functions to those already described will be given the same reference numbers, and overlapping detailed descriptions may be omitted.

In each of the embodiments, as an example of a display device, a display device comprising a display panel in which a liquid crystal display element is used is disclosed. However, each of the embodiments does not preclude the application of individual technical ideas disclosed in the embodiments to display devices in which display elements other than the liquid crystal display element are used. As the display elements other than the liquid crystal display element, a self-luminous display panel comprising an organic electroluminescent display element, etc., an electronic-paper type display panel comprising a cataphoretic element, etc., and the like are assumed.

First Embodiment

FIG. 1 is a plan view showing a schematic structure of a display device 1 according to a first embodiment. The display device 1 can be used for various devices, for example, a smartphone, a tablet terminal, a mobile telephone, a personal computer, a television receiver, a vehicle-mounted device, and a game console.

The display device 1 comprises a display panel 2, drive electrodes TX (TX1 to TXn), detection electrodes RX (RX1 to RXm) opposed to the respective drive electrodes TX, a driver IC 3 functioning as a driver module, and a touch detection IC 4 functioning as a detection module. For example, n and m are integers greater than or equal to two. The drive electrodes may be referred to as common electrodes.

The display panel 2 comprises a rectangular array substrate AR (first substrate) and a rectangular counter-substrate CT (second substrate) smaller in shape than the array substrate AR. In the example of FIG. 1, the array substrate AR and the counter-substrate CT are attached to each other, such that three sides of each substrate are laid on three sides of the other substrate. The array substrate AR comprises a terminal area NA (unopposed area) not opposed to the counter-substrate CT.

In an area where the array substrate AR and the counter-substrate CT are opposed, the display panel 2 comprises a display area DA (active area) where an image is displayed and a peripheral area FA between the display area DA and end portions of the display panel 2. In the example of FIG. 1, the display area DA is a rectangle comprising a first side E1 on the terminal area NA side, a second side E2 opposite to the first side E1, and a third side E3 and a fourth side E4 connecting the first side E1 and the second side E2. In the following description, a direction parallel to the first side E1 and the second side E2 will be referred to as a first direction X, and a direction parallel to the third side E3 and the fourth side E4 will be referred to as a second direction Y. In the present embodiment, the first direction X and the second direction Y cross perpendicularly. However, the first direction X and the second direction Y may cross at other angles.

In the display area DA, the drive electrodes TX1 to TXn extend from the first side E1 to the second side E2 in the second direction Y, and are arranged in the first direction X. The drive electrodes TX1 to TXn can be formed of a transparent conductive film of, for example, indium tin oxide (ITO). The drive electrodes TX1 to TXn are formed, for example, in the display panel 2, that is, in the array substrate AR.

In the display area DA, the detection electrodes RX1 to RXm extend from the third side E3 to the fourth side E4 in the first direction X, and are arranged in the second direction Y. The detection electrodes RX1 to RXm can be formed of a transparent conductive film of ITO, etc., or a conductive pattern in which a metal wire is used. The detection electrodes RX1 to RXm are formed, for example, on a surface of the counter-substrate CT, which is opposite to a surface opposed to the array substrate AR.

The driver IC 3 executes control related to image display, and mounted in the terminal area NA. The driver IC 3 is mounted by a Chip On Glass (COG) method, but may also be mounted on a first flexible printed circuit 6.

In the terminal area NA, a mounting terminal 5 is formed. To the mounting terminal 5, the first flexible printed circuit 6 which supplies image data to the display panel 2 is connected.

At an end portion of the counter-substrate CT along the terminal area NA, a mounting terminal 7 is formed. To the mounting terminal 7, a second flexible printed circuit 8 which outputs a detection signal from the detection electrodes RX1 to RXm is connected. In the example of FIG. 1, the touch detection IC 4 is mounted on the second flexible printed circuit 8.

The detection electrodes RX1 to RXm are, for example, connected to the mounting terminal 7 via detection lines DL formed on the surface of the counter-substrate CT in the peripheral area FA. In the example of FIG. 1, the detection lines DL connecting the detection electrodes RX which are odd-numbered from the second side E2 side of the display area DA to the mounting terminal 7 are routed through a space between the third side E3 of the display area DA and an end portion (a left end portion in the figure) of the counter-substrate CT, and are connected to the odd-numbered detection electrodes RX. On the other hand, the detection lines DL connecting the detection electrodes RX which are even-numbered from the second side E2 side of the display area DA to the mounting terminal 7 are routed through a space between the first side E1 of the display area DA and an end portion on the terminal area NA side of the counter-substrate CT, and through a space between the fourth side E4 of the display area DA and an end portion (a right end portion in the figure) of the counter-substrate CT, and are connected to the even-numbered detection electrodes RX.

FIG. 2 is a diagram schematically showing an example of a section of the display device 1 in the display area DA. The section shown in the figure focuses on one sub-pixel SPX. Sub-pixels SPX corresponding to different colors, respectively, form one pixel for displaying a color image.

In the example of FIG. 2, the array substrate AR comprises a first insulating substrate 10, a first insulating layer 11, a second insulating layer 12, a first alignment film 13, a pixel electrode PE, and a drive electrode TX. The first insulating layer 11 is formed on a surface on the counter-substrate CT side of the first insulating substrate 10. The drive electrode TX is formed on the first insulating layer 11. The second insulating layer 12 covers the drive electrode TX. The pixel electrode PE is provided in each of the sub-pixels SPX, and is formed on the second insulating layer 12. For example, the pixel electrode PE comprises one or more slits SL. The first alignment film 13 covers the pixel electrode PE and a part of the second insulating layer 12.

The counter-substrate CT comprises a second insulating substrate 20, a light-shielding layer 21, a color filter 22, an overcoat layer 23, and a second alignment film 24. The light-shielding layer 21 is formed on a surface on the array substrate AR side of the second insulating substrate 20, and separates the sub-pixel SPX. The color filter 22 is formed on a surface on the array substrate AR side of the second insulating substrate 20, and colored in a color corresponding to the sub-pixel SPX. The overcoat layer 23 covers the color filter 22. The second alignment film 24 covers the overcoat layer 23.

A liquid crystal layer LC including liquid crystal molecules is formed between the first alignment film 13 and the second alignment film 24. For example, a detection electrode RX is formed on a surface on a side not opposed to the array substrate AR of the second insulating substrate 20. In the example of FIG. 2, the drive electrode TX is formed in the array substrate AR; however, the drive electrode TX may be formed in the counter-substrate CT. In addition, the internal structure of the display panel 2 is not limited to those disclosed herein, and various structures can be applied.

Next, an example of a principle according to which an object in contact with or in proximity to the display area DA is detected by the drive electrodes TX and the detection electrodes RX will be described with reference to FIG. 3.

Capacitance Cc exists between the drive electrode TX and the detection electrode RX which are opposed to each other. When a drive signal Stx is supplied to the drive electrode TX, a current flows through the detection electrode RX via the capacitance Cc, and thus, a detection signal Srx is obtained from the detection electrode RX. The drive signal Stx is, for example, a rectangular pulse, and the detection signal Srx is a rectangular pulse of a voltage corresponding to the drive signal Stx.

When an object O, which is a conductor such as a user's finger, approaches the display device 1, capacitance Cx is produced between the detection electrode RX in proximity to the object O and the object O. When the drive signal Stx is supplied to the drive electrode TX, a waveform of the detection signal Srx obtained from the detection electrode RX in proximity to the object O changes under the influence of the capacitance Cx. That is, based on the detection signals Srx obtained from the respective detection electrodes RX, the touch detection IC 4 can detect the object O in contact with or in proximity to the display device 1. In addition, the touch detection IC 4 can detect positions of the object O in the first direction X and the second direction Y, based on the detection signals Srx obtained from the respective detection electrodes RX in each time phase when the drive signals Stx are sequentially supplied to the respective drive electrodes TX in a time-division manner. The above-described method is referred to as a mutual-capacitive method, a mutual-detection method, or the like.

Next, the image display of the display device 1 will be described. FIG. 4 is a diagram showing a schematic equivalent circuit related to the image display. The display device 1 comprises scanning lines G, signal lines S crossing the scanning lines G, a first gate driver GD1, a second gate driver GD2, and a selector (an RGB switch) SD. The selector SD is connected to the driver IC 3 via video lines VL.

In the display area DA, the scanning lines G each extend in the first direction X, and are arranged in the second direction Y. In the display area DA, the signal lines S each extend in the second direction Y, and are arranged in the first direction X. Each of the scanning lines G and each of the signal lines S are formed in the array substrate AR. Each of the scanning lines G is connected to the first gate driver GD1 and the second gate driver GD2. Each of the signal lines S is connected to the selector SD.

In the example of FIG. 4, an area separated by each of the scanning lines G and each of the signal lines S corresponds to one sub-pixel SPX. For example, in the present embodiment, one pixel PX is constituted of a sub-pixel SPXR corresponding to red, a sub-pixel SPXG corresponding to green, and a sub-pixel SPXB corresponding to blue. The pixel PX may further comprise a sub-pixel SPX corresponding to white, etc.

Each of the sub-pixels SPX comprises a thin-film transistor TFT (switching element) formed in the array substrate AR. The thin-film transistor TFT is electrically connected to the scanning line G, the signal line S, and the pixel electrode PE. At the time of display, the drive electrode TX is set at a common potential, and functions as the so-called common electrode.

The first gate driver GD1 and the second gate driver GD2 sequentially supply a scanning signal to the respective scanning lines G. The selector SD is controlled by the driver IC 3, and selectively supplies a video signal to the respective signal lines S. A scanning signal is supplied to a scanning line G connected to a certain thin-film transistor TFT, and a video signal is supplied to a signal line S connected to the thin-film transistor TFT. A voltage according to the video signal is applied to the pixel electrode PE, and the alignment of liquid crystal molecules of the liquid crystal layer LC changes from an initial alignment state in which the voltage is not applied, by an electric field produced between the pixel electrode PE and the drive electrode TX. Through the above-described operation, an image is displayed in the display area DA.

As described above, in the display device 1 according to the present embodiment, the drive electrodes TX are used both for image display and touch detection. A structure necessary to achieve this function will be described hereinafter.

FIG. 5 is a diagram schematically showing elements necessary for image display and touch detection for which the drive electrodes TX are used, etc., in the display device 1. The display device 1 shown in this figure comprises a first switch group G1, a second switch group G2, a third switch group G3, a fourth switch group G4, a fifth switch group G5, a scanner SC, a first supply line 30, and a second supply line 40, in addition to the above-described elements. The third switch group G3 is, for example, included in the selector SD, and also referred to as a multiplexer.

For example, each of the switch groups G1 to G5, the scanner SC, and each of the gate drivers GD1 and GD2 are all formed in the display panel 2 in the area where the array substrate AR and the counter-substrate CT are opposed. These elements can be formed in the array substrate AR, for example, in a step of forming the thin-film transistor TFT shown in FIG. 4, etc., which forms the array substrate AR.

In the example of FIG. 5, the first switch group G1, the selector SD (the third switch group G3), the fourth switch group G4, and the scanner SC are disposed between the first side E1 of the display area DA and the end portion on the terminal area NA side of the counter-substrate CT. The first gate driver GD1 is disposed between the third side E3 of the display area DA and an end portion (a left end portion in the figure) of the display panel 2. The second gate driver GD2 is disposed between the fourth side E4 of the display area DA and an end portion (a right end portion in the figure) of the display panel 2. The second switch group G2 and the fifth switch group G5 are disposed between the second side E2 of the display area DA and an end portion (an upper end portion in the figure) of the display panel 2.

To the first supply line 30, a common voltage $V_{COM}$ for image display is applied. The first supply line 30 extends toward the first switch group G1 from both sides of the driver IC 3 in the terminal area NA. Moreover, the first supply line 30 branches on the way, passes through a space between the first gate driver GD1 and the display area DA and a space between the second gate driver GD2 and the display area DA, and is connected to the second switch group G2. The first supply line 30 may pass through a space between the first gate driver GD1 and an end portion of the display panel 2 and a space between the second gate driver GD2 and the display panel 2, and be connected to the second switch group G2.

The second supply line 40 supplies a drive signal (the above-described drive signal Stx) for touch detection. In the present embodiment, the second supply line 40 includes a low-voltage line 41 to which a first voltage $V_{TPL}$ (first drive voltage) is applied, and a high-voltage line 42 to which a second voltage $V_{TPH}$ (second drive voltage) greater than the first voltage $V_{TPL}$ is applied. The low-voltage line 41 and the high-voltage line 42 extend toward the first switch group G1 from both sides of the driver IC 3 in the terminal area NA.

For example, the first supply line 30, the low-voltage line 41, and the high-voltage line 42 are connected to the touch detection IC 4 via the mounting terminal 5 and the first flexible printed circuit 6. The first supply line 30, the low-voltage line 41, and the high-voltage line 42 may be connected to the driver IC 3. The first switch group G1 switches a target to which the drive electrodes TX1 to TXn are connected between the first supply line 30 and the second supply line 40 (the low-voltage line 41 or the high-voltage line 42).

The selector SD and the driver IC 3 are connected by a first line group LG1 and a second line group LG2. Each of the line groups LG1 and LG2 is constituted of the video lines VL, and transmits a video signal supplied from the driver IC 3 to the pixel electrode PE of each of the sub-pixels SPX via the signal lines S formed in the display area DA. In the example of FIG. 5, the line groups LG1 and LG2 are disposed with a space therebetween in the first direction X.

The third switch group G3, which is the selector SD, distributes video signals supplied from the driver IC 3 to the signal lines S formed in the display area DA. The number of video lines VL can be thereby decreased. On the other hand, as pixels become finer, a driver IC needs to comprise a number of memories and logic circuits. Thus, there is a limit to a decrease in size. Accordingly, the width of a line group connecting the driver IC 3 and the selector SD in the first direction X can be small as compared to the width of the driver IC 3 in the first direction X. Thus, in the present embodiment, the line group connecting the driver IC 3 and the selector SD is divided into the first line group LG1 and the second line group LG2.

The scanner SC controls the first switch group G1, based on a start signal (start), a clock signal (clock), and an enable signal (enable) supplied from the driver IC 3. In the present embodiment, all of the scanner SC is disposed in a space between the first line group LG1 and the second line group LG2. Control lines CL connecting the scanner SC and the first switch group G1, the first line group LG1, and the second line group LG2 are all formed in the array substrate AR. For example, the control lines CL are formed in a layer closer to the counter-substrate CT side than each of the line groups LG1 and LG2.

The array substrate AR and the counter-substrate CT are attached to each other by a sealing material 9 surrounding the display area DA. The sealing material 9 is formed in a predetermined width. The liquid crystal layer LC is enclosed between the array substrate AR and the counter-substrate CT by the sealing material 9. In the example of FIG. 5, the scanner SC, each of the switch groups G1 to G5, and each of the gate drivers GD1 and GD2 are located further inward than external end portions of the sealing material 9. It should be noted that part or all of the scanner SC may be formed further outward than the external end portions of the sealing material 9.

Figure 6:
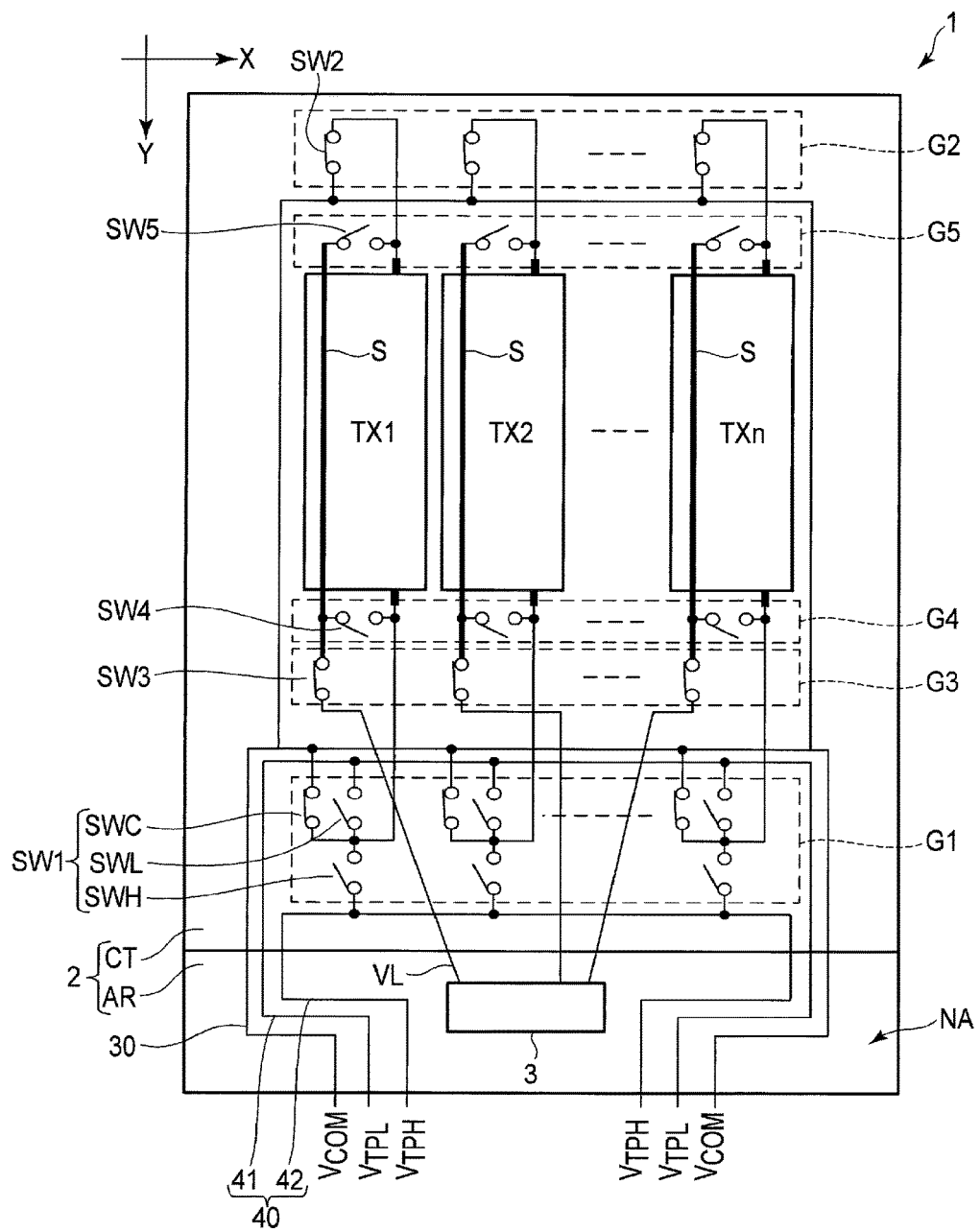
FIG. 6 is a diagram showing a state in a display period of each switch group of the display device according to the first embodiment.
Figure 7:
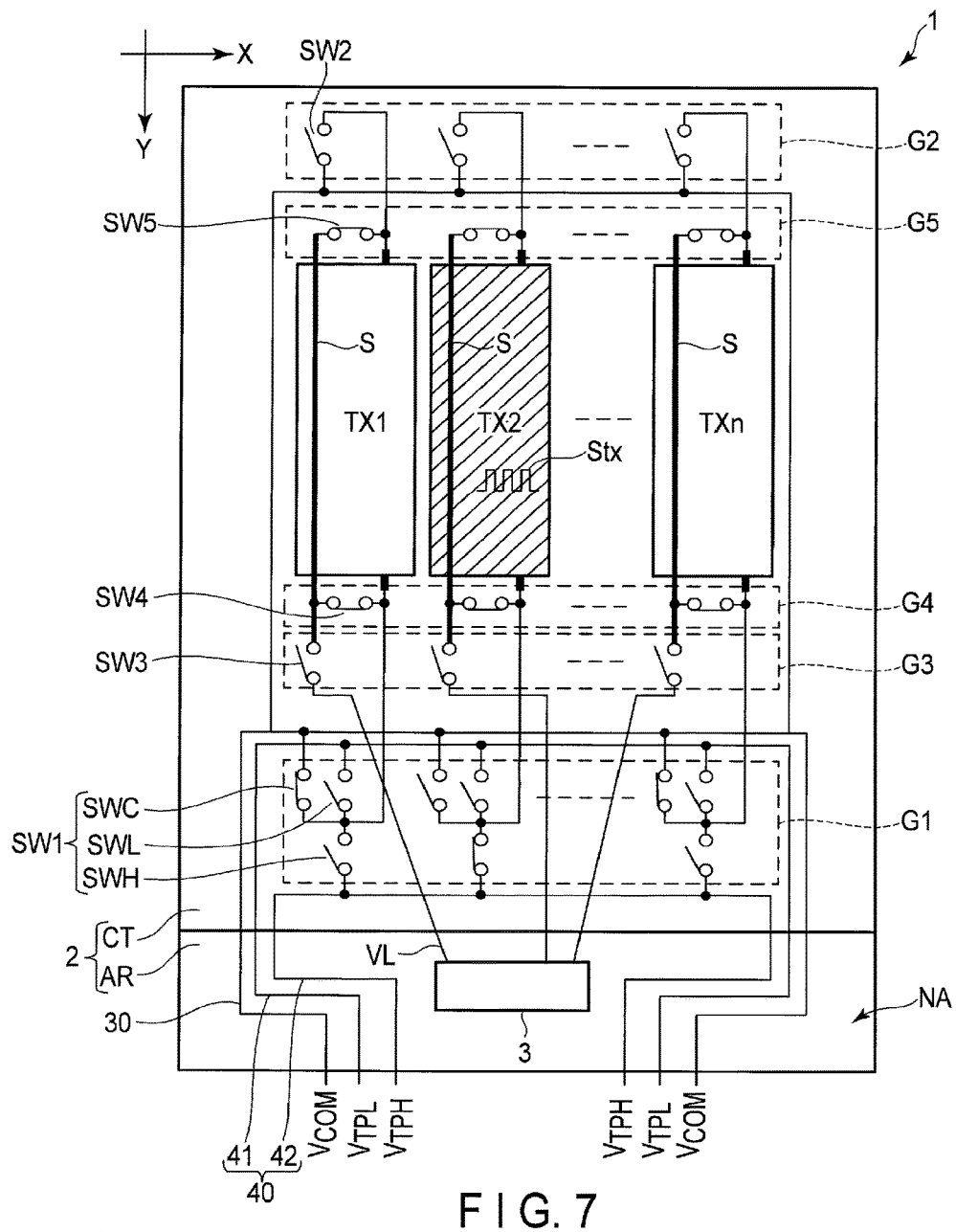
FIG. 7 is a diagram showing a state in a touch detection period of each switch group of the display device according to the first embodiment.

The operation of each of the switch groups G1 to G5 in the present embodiment will be described with reference to FIG. 6 and FIG. 7. FIG. 6 shows a state of each of the switch groups G1 to G5 in a display period (first period) in which an image is displayed. FIG. 7 shows a state of each of the switch groups G1 to G5 in a touch detection period (second period) in which an object in contact with or in proximity to the display area DA is detected. The display period and the touch detection period are, for example, alternately repeated.

As shown in FIG. 6 and FIG. 7, the first switch group G1 comprises first switches SW1 provided for the drive electrodes TX1 to TXn, respectively. The first switches SW1 switch a target to which the drive electrodes TX are connected between the first supply line 30 and the second supply line 40 (the low-voltage line 41 or the high-voltage line 42). Specifically, the first switches SW1 each include a common-voltage switch SWC which connects (turns on) or disconnects (turns off) the drive electrodes TX and the first supply line 30 to or from each other, a low-voltage switch SWL which connects (turns on) or disconnects (turns off) the drive electrodes TX and the low-voltage line 41 to or from each other, and a high-voltage switch SWH which connects (turns on) or disconnects (turns off) the drive electrodes TX and the high-voltage line 42 to or from each other. The common-voltage switch SWC, the low-voltage switch SWL, and the high-voltage switch SWH are all turned on or off by a signal from the scanner SC.

The second switch group G2 comprises second switches SW2 provided for the drive electrodes TX1 to TXn, respectively. The second switches SW2 connect (turn on) or disconnect (turn off) the drive electrodes TX and the first supply line 30 to or from each other. For example, the second switches SW2 are turned on or off under the control of the driver IC 3.

The third switch group G3, which is the selector SD, comprises third switches SW3 provided for the signal lines S provided in the display area DA, respectively. The third switches SW3 are provided at ends of the video lines VL extending from the driver IC 3, and connect (turn on) or disconnect (turn off) the respective signal lines S in the display area DA and the driver IC 3 to or from each other. For example, the third switches SW3 are turned on or off to sequentially supply the respective signal lines S with video signals supplied in a time division manner via the video lines VL from the driver IC 3, based on a control signal supplied from the driver IC 3.

The fourth switch group G4 comprises fourth switches SW4 provided for the signal lines S. The fourth switches SW4 connect (turn on) or disconnect (turn off) the signal lines S and the drive electrodes TX to or from each other. For example, the fourth switches SW4 are turned on or off based on a control signal supplied from the driver IC 3 or the scanner SC.

The fifth switch group G5 comprises fifth switches SW5 provided for the signal lines S. The fifth switches SW5 connect (turn on) or disconnect (turn off) the signal lines S and the drive electrodes TX to or from each other. For example, the fifth switches SW5 are turned on or off based on a control signal supplied from the driver IC 3 or the scanner SC.

The first switches SW1, the third switches SW3, and the fourth switches SW4 are arranged in the first direction X along the first side E1 between the first side E1 of the display area DA and the terminal area NA shown in FIG. 1, etc. The second switches SW2 and the fifth switches SW5 are arranged in the first direction X along the second side E2 of the display area DA shown in FIG. 1, etc.

A part of the first supply line 30, the low-voltage line 41, and the high-voltage line 42 pass through a space between the third switch group G3 and the terminal area NA. The first switch group G1 is disposed between the third switch group G3 and the driver IC 3.

As shown in FIG. 6, in the display period, the common-voltage switch SWC of each of the first switches SW1 is turned on, and the low-voltage switch SWL and the high-voltage switch SWH of each of the first switches SW1 are turned off. Moreover, each of the second switches SW2 is turned on, and each of the fourth switches SW4 and each of the fifth switches SW5 are turned off. Each of the third switches SW3 is selectively turned on or off in accordance with the signal line S to which a video signal from each of the video lines VL is supplied.

When each of the common-voltage switches SWC is turned on, the common voltage $V_{COM}$ is applied to the drive electrodes TX1 to TXn from end portions on the terminal area NA side. Moreover, when each of the second switches SW2 is turned on, the common voltage $V_{COM}$ is applied to the drive electrodes TX1 to TXn from end portions opposite to the terminal area NA. The common voltage $V_{COM}$ is thus applied from both end portions in an extending direction of the drive electrodes TX (the second direction Y), whereby the potential of the drive electrodes TX can be entirely stabilized.

In the display period, a video signal is supplied from the driver IC 3 to each of the signal lines S, and a scanning signal is supplied to each of the scanning lines G from the first gate driver GD1 and the second gate driver GD2, so that an electric field necessary for image display is formed between the pixel electrode PE and the drive electrode TX of each of the sub-pixels SPX. A common voltage may be generated in the driver IC 3, and supplied from the driver IC 3.

In the touch detection period, for example, a drive signal is sequentially supplied to the drive electrodes TX1 to TXn. The drive electrode TX to which a drive signal is supplied (hereinafter, referred to as a drive target) and the other drive electrodes TX differ in the connection state of the first switches SW1.

In the example of FIG. 7, the case where the drive electrode TX2 is a drive target is assumed. The common-voltage switch SWC of the drive electrode TX2, which is the drive target, is turned off, and the common-voltage switches SWC of the other drive electrodes TX are all turned on. The second switches SW2 and the third switches SW3 are all turned off, and the fourth switches SW4 and the fifth switches SW5 are all turned on.

A target to which the drive electrode TX2 as a drive target is connected is swung between the low-voltage line 41 and the high-voltage line 42. That is, the low-voltage switch SWL and the high-voltage switch SWH of the drive electrode TX2 are alternately turned on and off, whereby a drive signal Stx that toggles between the first voltage $V_{TPL}$ and the second voltage $V_{TPH}$ is generated and applied to the drive electrode TX2. Based on a detection signal (the above-described detection signal Srx) obtained from the detection electrodes RX1 to RXm in response to the drive signal Stx, the touch detection IC 4 detects a position of an object in contact with or in proximity to the display area DA.

Because each of the fourth switches SW4 and each of the fifth switches SW5 are turned on, the signal lines S are at the same potential as the drive electrodes TX, which are opposed thereto, respectively. The formation of capacitance between each of the signal lines S and each of the drive electrodes TX can be thereby prevented, and the accuracy of touch detection can be increased. In the present embodiment, the drive electrodes TX and the signal lines S are connected at both end portions in an extending direction of the drive electrodes TX and the signal lines S (the second direction Y). Therefore, the drive electrodes TX and the signal lines S can be entirely and stably set at the same potential.

In the touch detection period, the video lines VL between the driver IC 3 and the third switch group G3 are all floating, and the unnecessary formation of capacitance caused by each of the video lines VL is reduced. In the touch detection period, all or some of the signal lines S may be made floating by turning off all or some of the fourth switches SW4 and the fifth switches SW5.

A drive electrode TX as a drive target may be selected in the order of the drive electrode TX1 to the drive electrode TXn, or may be selected in other orders. In addition, drive electrodes TX may be simultaneously selected as a drive target. Moreover, all the drive electrodes TX1 to TXn may be selected as a drive target in a single touch detection period, or the drive electrodes TX1 to TXn may be dispersedly selected as a drive target in two or more touch detection periods.

The structure of the scanner SC will be herein described. FIG. 8 is a diagram showing an example of a schematic structure of the scanner SC. As in the case of FIG. 7, it is assumed that the drive electrode TX2 is a drive target.

The scanner SC comprises shift registers SR (SR1 to SRn) provided for the drive electrodes TX1 to TXn, respectively. The shift registers SR operate, based on a start signal (start), a clock signal (clock), and an enable signal (enable) supplied from the driver IC 3.

Each of the shift registers SR is connected to the common-voltage switch SWC via a first control line CL1, connected to the low-voltage switch SWL via a second control line CL2, and connected to the high-voltage switch SWH via a third control line CL3.

Each of the shift registers SR outputs a control signal OUT1 for turning on and off the common-voltage switch SWC to the first control line CL1, outputs a control signal OUT2 for turning on and off the low-voltage switch SWL to the second control line CL2, and outputs a control signal OUT3 for turning on and off the high-voltage switch SWH to the third control line CL3.

In order to alternately turn on and off the low-voltage switch SWL and the high-voltage switch SWH corresponding to a drive electrode TX as a drive target, the control signals OUT2 and OUT3 of a shift register SR corresponding to the drive electrode TX are in antiphase to each other.

Next, a concrete arrangement example of each of the switch groups G1 to G5 will be described. FIG. 9 is a diagram schematically showing a part of one drive electrode TX, each of the switches SW1 to SW5 disposed in the vicinity of the drive electrode TX, etc. In the figure, each of the switches SW1 to SW5 shows a state in which in the touch detection period, the shown drive electrode TX is not a drive target and a common voltage $V_{COM}$ is applied to it.

In the example of FIG. 9, the drive electrode TX formed of a transparent conductive film comprises first projections 51 projecting toward the terminal area NA side (the lower side in the figure), and second projections 52 projecting toward the opposite side (the upper side in the figure) to the terminal area NA. For example, the first projections 51 extend to a space between the low-voltage line 41 and the high-voltage line 42.

The common-voltage switches SWC, the low-voltage switches SWL, and the high-voltage switches SWH constituting the first switches SW1 connect or disconnect the first supply line 30, the low-voltage line 41, and the high-voltage line 42 to or from the first projections 51 in the vicinity of these lines. The second switches SW2 connect or disconnect the second projections 52 to or from the first supply line 30 routed to the opposite side (the upper side in the figure) to the terminal area NA.

FIG. 9 shows eight video lines VL (VL1 to VL8). Each of the video lines VL branches into three routes in the vicinity of end portions on the drive electrode TX side, and the third switches SW3 are connected to the routes, respectively.

The signal lines S in the display area DA include signal lines Sr (Sr1 to Sr8) which supply a video signal to the red sub-pixel SPXR, signal lines Sg (Sg1 to Sg8) which supply a video signal to the green sub-pixel SPXG, and signal lines Sb (Sb1 to Sb8) which supply a video signal to the blue sub-pixel SPXB. The signal lines Sr, the signal lines Sg, and the signal lines Sb are, for example, repeatedly disposed in this order. Three third switches SW3 connected to one branching video line VL are connected to a signal line Sr, a signal line Sg, and a signal line Sb, respectively.

In the example of FIG. 9, of the signal lines Sr1, Sg1, Sb1, Sr2, Sg2, and Sb2 arranged in order, the signal lines Sr1, Sg2, and Sb1 are connected to three third switches SW3 connected to the video line VL1, respectively, and the signal lines Sr2, Sg1, and Sb2 are connected to three third switches SW3 connected to the video line VL2, respectively. In the same manner, the signal lines Sr1, Sg3, Sb3, Sr4, Sg4, and Sb4 are connected to the video lines VL3 and VL4, the signal lines Sr5, Sg5, Sb5, Sr6, Sg6, and Sb6 are connected to the video lines VL5 and VL6, and the signal lines Sr7, Sg7, Sb7, Sr8, Sg8, and Sb8 are connected to the video lines VL7 and VL8. In this connection state, by reversing the polarities of video signals supplied to adjacent video lines VL, the polarities of adjacent signal lines S can be reversed in the entire display area DA. Although one video line VL is connected to three signal lines S via the third switches SW3, it may be connected two or less, or four or more signal lines S. In addition, sub-pixels SPX displaying white and other colors may be separately provided. Moreover, if the arrangement of pixels is changed, the arrangement of the signal lines S and the third switches SW3 may also be changed. Even in such a case, the present invention can be applied.

Because the first supply line 30, the low-voltage line 41, and the high-voltage line 42 pass through a space between each of the third switches SW3 and the terminal area NA located on the lower side in the figure, the number of video lines VL crossing the first supply line 30, the low-voltage line 41, and the high-voltage line 42 is one third the number of signal lines S. By reducing the number of lines crossing the first supply line 30, the low-voltage line 41, and the high-voltage line 42 in this manner, a space where each of the switches SWC, SWL, and SWH constituting the first switches SW1 is disposed can be secured large. Therefore, the resistance of the first switches SW1 can be reduced by increasing the size of each of the switches SWC, SWL, and SWH. Moreover, in the example of FIG. 9, a space where the first switches SW1 are formed is secured larger by passing the video lines VL1 to VL8 densely through a space between adjacent first projections 51. It should be noted that only one projection may be provided for one drive electrode TX. In addition, the drive electrode TX may cover all the fifth switches SW5.

As in the example of FIG. 9, if first switches SW1 are provided for one drive electrode TX, the structure in which the first switches SW1 are controlled by one shift register SR can be adopted. In this case, for example, it suffices if each of the control lines CL1 to CL3 shown in FIG. 8 is made to branch into routes on the way, or the respective control lines are extended to be connected to the common-voltage switches SWC, the low-voltage switches SWL, and the high-voltage switches SWH of the first switches SW1 corresponding to the one drive electrode TX.

The fourth switches SW4 and the fifth switches SW5 are provided for the signal lines S, respectively. Accordingly, the connection or disconnection between the respective signal lines S and the drive electrode TX can be controlled in units of a signal line S or in units of signal lines S, and there is no restrictions in design on the relationship between a boundary between adjacent drive electrodes TX and the signal lines S. In addition, because the fourth switches SW4 are located closer to the display area DA side than the third switches SW3, the video lines VL and the signal lines S can be completely separated by turning off the third switches SW3 in the touch detection period.

Next, the relationship between the detection lines DL shown in FIG. 1, the scanner SC, and the first switch group G1 will be described.

FIG. 10 is a diagram schematically showing the relationship between the detection lines DL, the scanner SC, the first switch group G1, etc. A bunch of the detection lines DL extending from the mounting terminal 7 is routed to the third side E3 side and the fourth side E4 side of the display area DA in the peripheral area FA, and connected to the detection electrodes RX. The detection lines DL routed to the first side E1 side pass through a space between the scanner SC and the first switch group G1. That is, the first switches SW1 are disposed between the detection lines DL and the display area DA.

Figure 11:
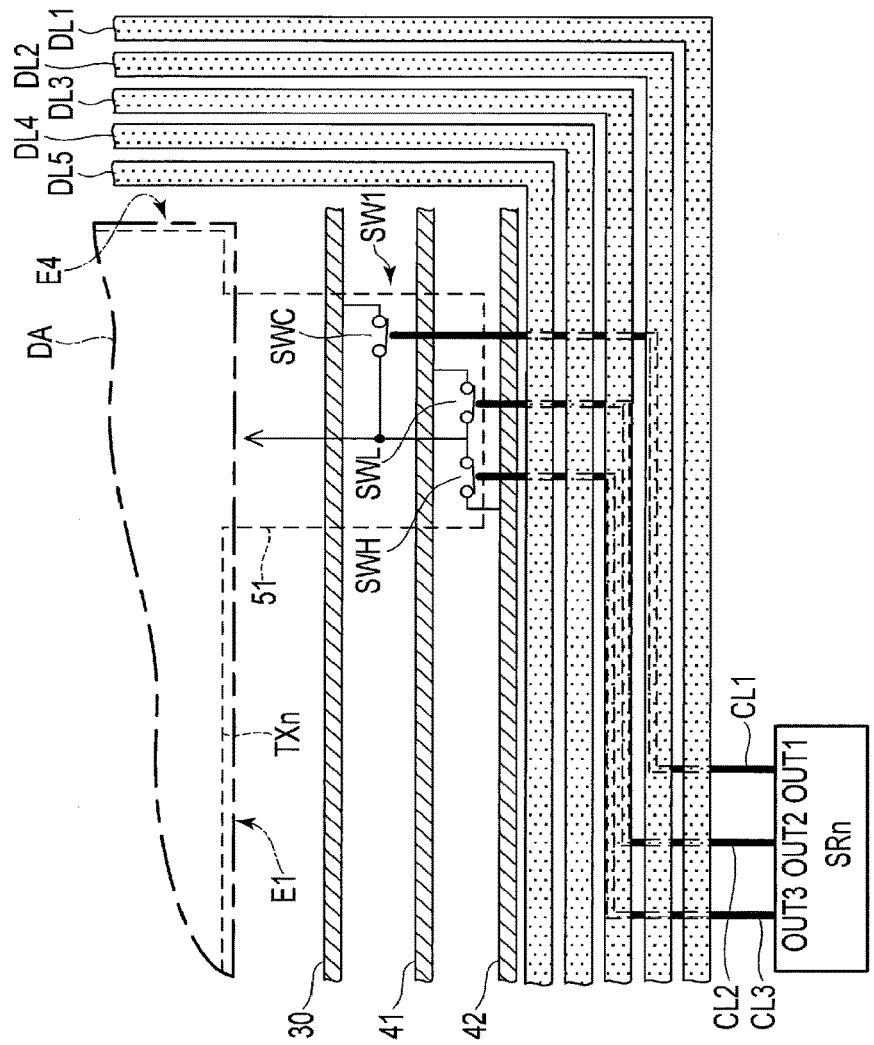
FIG. 11 is a diagram schematically showing a structure surrounding a first switch of the display device according to the first embodiment.

FIG. 11 is a diagram schematically showing a structure surrounding a first switch SW1 disposed at the furthest end on the fourth side E4 side of the display area DA. The first switch SW1 comprises a common-voltage switch SWC, a low-voltage switch SWL, and a high-voltage switch SWH which selectively connect the first projection 51 of the drive electrode TXn to the first supply line 30, the low-voltage line 41, and the high-voltage line 42, and is controlled by the shift register SRn in the scanner SC.

In the example of FIG. 11, the first supply line 30, the low-voltage line 41, and the high-voltage line 42 extend parallel to the first side E1 in a space between the five detection lines DL (DL1 to DL5) routed to the fourth side E4 side and the display area DA. In addition, the common-voltage switch SWC, the low-voltage switch SWL, and the high-voltage switch SWH are all located between the detection lines DL1 to DL5 and the display area DA. In this arrangement, the structure in which the drive electrode TXn and the detection lines DL1 to DL5 do not cross can be adopted as shown in the figure.

The first control line CL1, the second control line CL2, and the third control line CL3 connecting the shift register SRn and the first switch SW1 cross the detection lines DL1 to DL5.

Specifically, in the example of FIG. 11, the first control line CL1 extending from the shift register SRn bends after crossing the detection line DL1, extends parallel to an extending direction of the detection line DL2 while being opposed to the detection line DL2, bends toward the display area DA side, crosses the detection lines DL3 to DL5, and is connected to the common-voltage switch SWC.

In addition, the second control line CL2 and the third control line CL3 extending from the shift register SRn bend after crossing the detection lines DL1 and DL2, extend parallel to an extending direction of the detection line DL3 while being opposed to the detection line DL3, bend toward the display area DA side, cross the detection lines DL4 and DL5, and are connected to the low-voltage switch SWL and the high-voltage switch SWH, respectively.

In the touch detection period, the common-voltage switch SWC is turned off, if the drive electrode TXn is a drive target, and is turned on otherwise. Therefore, the voltage of the control signal OUT1 supplied to the first control line CL1 is relatively stable, and noise is hardly incorporated into the detection lines DL1 to DL5 from the first control line CL1.

On the other hand, the low-voltage switch SWL and the high-voltage switch SWH are alternately turned on and off, if the drive electrode TXn is a drive target. Therefore, the voltage of the control signals OUT2 and OUT3 supplied to the second control line CL2 and the third control line CL3 changes frequently, and coupling noise is easily incorporated into the detection lines DL1 to DL5. The noise is remarkably incorporated, when the second control line CL2 and the third control line CL3 are opposed to the detection lines DL over a long distance.

In this regard, in the example of FIG. 11, the second control line CL2 is opposed to the detection line DL3 over a long distance, and the third control line CL3 is also opposed to the detection line DL3 over a long distance. Because the low-voltage switch SWL and the high-voltage switch SWH are alternately turned on and off, the control signals OUT2 and OUT3 are in antiphase to each other. Therefore, noise that can be incorporated into the detection lines DL from the second control line CL2 and the third control line CL3 is cancelled, and as a result, the accuracy of touch detection can be increased.

Although the shift register SRn, the drive electrode TXn, and the one first switch SW1 connected to the drive electrode TXn have been herein focused on, the relationship between the other shift registers SR, the other drive electrodes TX, and the other first switches SW1 connected to the drive electrode TX, and the relationship between these and the detection lines DL are also the same.

In the above-described present embodiment, as shown in FIG. 5, the scanner SC is disposed at a position between the first line group LG1 and the second line group LG3, which can usually be a dead space. A frame area (the peripheral area FA and the terminal area NA) necessary for the display panel 2 need not be enlarged.

In addition, in the present embodiment, as shown in FIG. 6, etc., the first switches SW1 are provided on the terminal area NA side for the respective drive electrodes TX, and the second switches SW2 are provided on the opposite side to the terminal area NA. Because a common voltage $V_{COM}$ can be applied to the respective drive electrodes TX from both end portions in the extending direction (the second direction Y) by the switches SW1 and SW2, the potential of each of the drive electrodes TX can be entirely stabilized.

Moreover, in the present embodiment, as shown in FIG. 11, etc., the first switches SW1 are disposed between the detection lines DL and the display area DA. Therefore, the structure in which the drive electrodes TX and the detection lines DL do not cross can be adopted, and the incorporation of noise into a detection signal Srx due to the coupling of the drive electrodes TX and the detection lines DL can be prevented to increase the touch detection accuracy.

Along with the above advantages, various other advantages can be achieved by the present embodiment.

Second Embodiment

A second embodiment will be described. The present embodiment differs from the first embodiment in the disposition of a scanner SC. The following description will mainly focus on differences from the first embodiment, and the same structures as in the first embodiment will be given the same reference numbers, and explanations thereof may be omitted.

Figure 12:
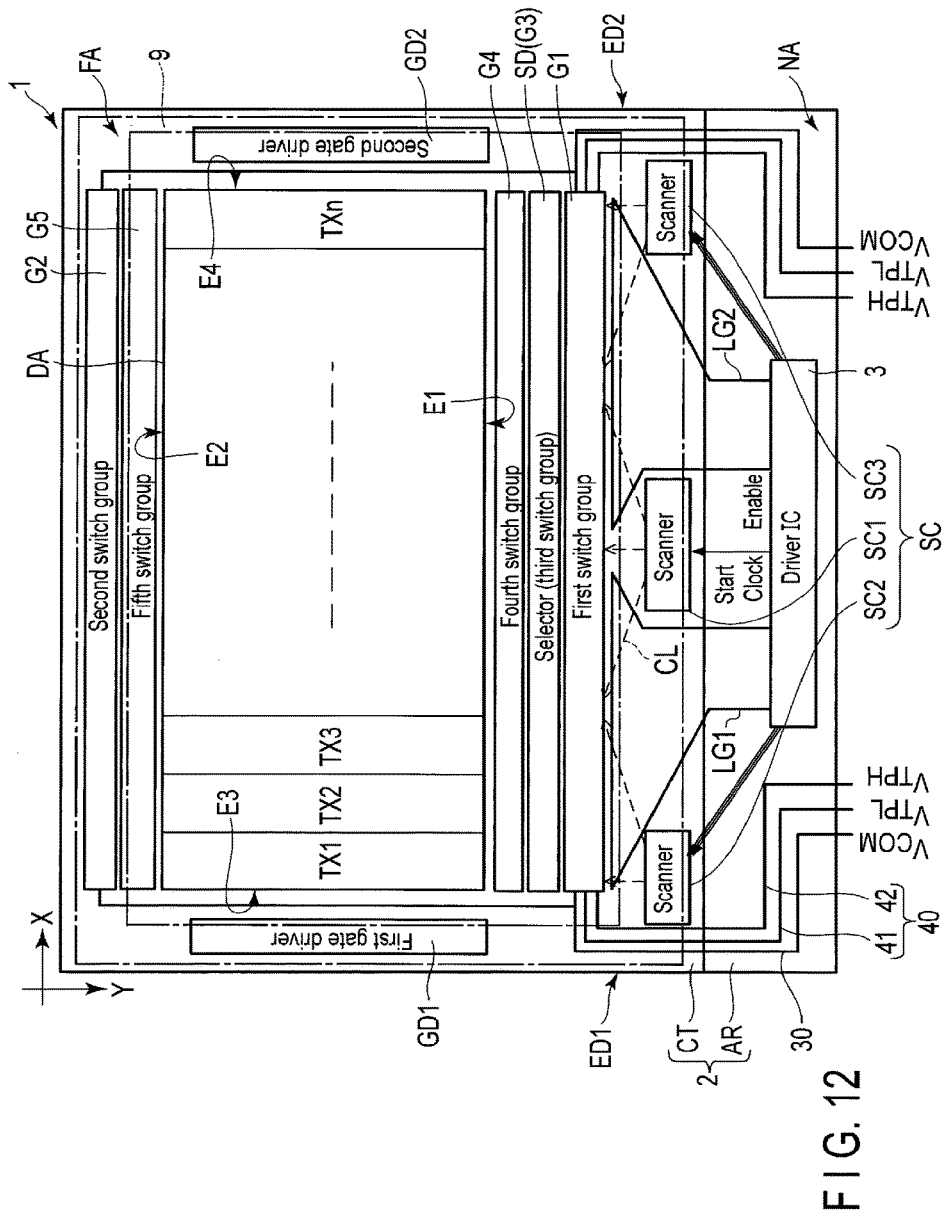
FIG. 12 is a diagram schematically showing elements necessary for image display and touch detection, etc., in a display device according to a second embodiment.

FIG. 12 is a diagram schematically showing elements necessary for image display and touch detection for which drive electrodes TX are used, etc., in a display device 1 according to the second embodiment. In the present embodiment, the scanner SC comprises a first portion SC1, a second portion SC2, and a third portion SC3.

The first portion SC1, the second portion SC2, and the third portion SC3 include one or more shift registers SR. For example, the shift register SR included in the second portion SC2 controls first switches SW1 arranged on a third side E3 side of first switches SW1 constituting a first switch group G1. The shift register SR included in the third portion SC3 controls first switches SW1 arranged on a fourth side E4 side of the first switches SW1 constituting the first switch group G1. The first portion SC1 controls the other first switches SW1, that is, first switches SW1 disposed near the center of the first switches SW1 constituting the first switch group G1.

The first portion SC1 is disposed in a space between a first line group LG1 and a second line group LG2 as in the case of the scanner SC in the first embodiment. The second portion SC2 is disposed between the first line group LG1 and a first end portion ED1 (a left end portion in the figure) of a display panel 2. The third portion SC3 is disposed between the second line group LG2 and a second end portion ED2 (a right end portion in the figure) of the display panel 2.

The first portion SC1, the second portion SC2, and the third portion SC3 are disposed between the first switch group G1 and an end portion of a counter-substrate CT on a terminal area NA side. In the example shown in the figure, the first portion SC1, the second portion SC2, and the third portion SC3 are opposed to a sealing material 9. However, at least parts of the first portion SC1, the second portion SC2, and the third portion SC3 may be formed inside the sealing material 9 or outside the sealing material 9 so as not to be opposed to the sealing material 9.

As in the present embodiment, if the scanner SC is divided into portions and disposed, a space between the first line group LG1 and the second line group LG2 can be efficiently used by disposing at least a part of the scanner SC in the space, for example, even in cases where all of the scanner SC cannot disposed in the space.

It should be noted that at least one of the second portion SC2 and the third portion SC3 may be, for example, disposed to be closer to an end portion (a lower end portion in FIG. 12) of an array substrate AR than the driver IC 3. In addition, the scanner SC may be constituted of the first portion SC1 and the second portion SC2 and not include the third portion SC3. In this case, the second portion SC2 may be disposed at a position of the third portion SC3 in FIG. 12. In addition, the scanner SC may be divided into more portions, not three of the first to third portions SC1 to SC3.

Third Embodiment

A third embodiment will be described. The present embodiment differs from the first embodiment in the disposition of a scanner SC. The following description will mainly focus on differences from the first embodiment, and the same structures as in the first embodiment will be given the same reference numbers, and explanations thereof may be omitted.

Figure 13:
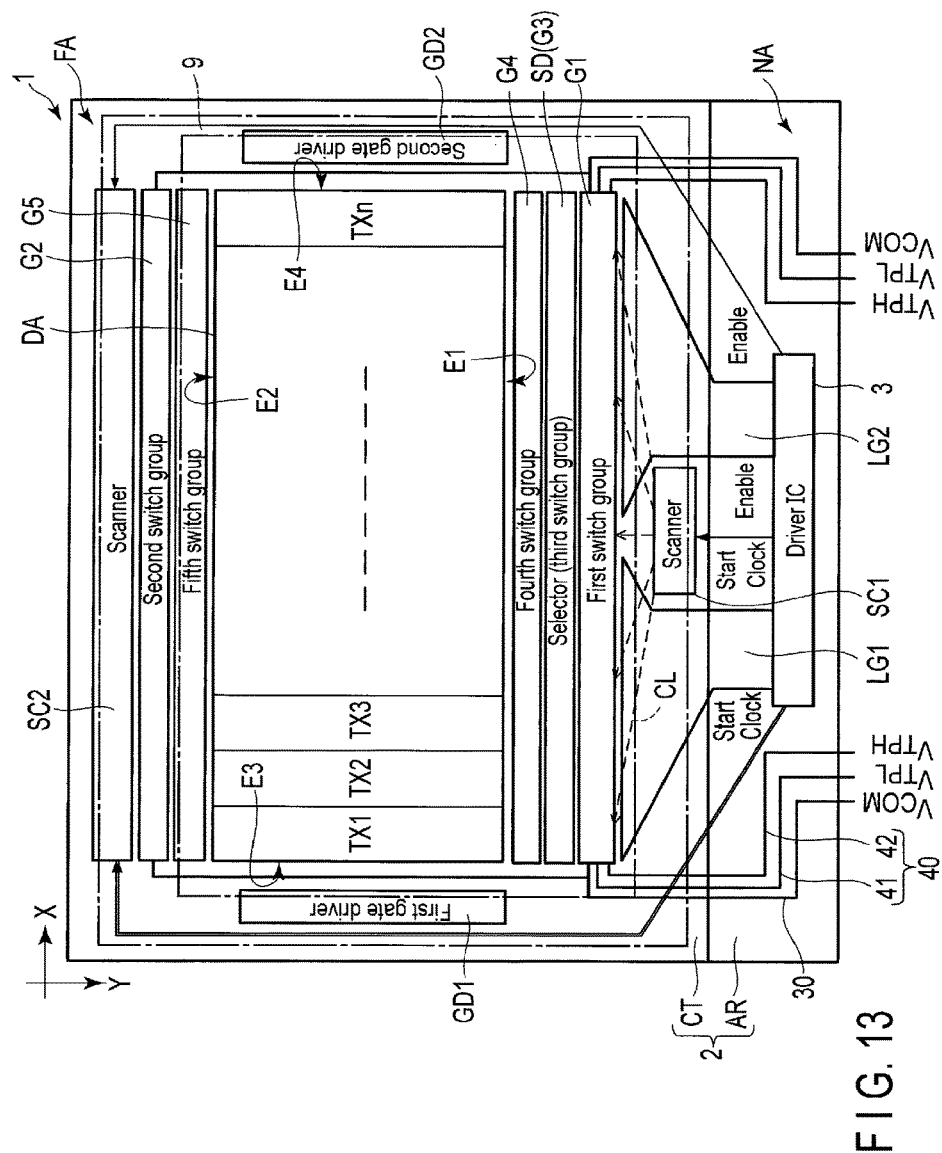
FIG. 13 is a diagram schematically showing elements necessary for image display and touch detection, etc., in a display device according to a third embodiment.

FIG. 13 is a diagram schematically showing elements necessary for image display and touch detection for which drive electrodes TX are used, etc., in a display device 1 according to the third embodiment. In the present embodiment, the scanner SC comprises a first portion SC1 and a second portion SC2.

The first portion SC1 and the second portion SC2 include, for example, the same number of shift registers SR as drive electrodes TX1 to TXn. The shift register SR included in the first portion SC1 individually controls each first switch SW1 constituting a first switch group G1 as in the first embodiment. The shift register SR included in the second portion SC2 individually controls each second switch SW2 included in a second switch group G2.

The first portion SC1 and the second portion SC2 are each supplied with a start signal (start), a clock signal (clock), and an enable signal (enable) from the driver IC 3. Because the second portion SC2 is controlled by these three types of signal, an increment of a line space in a peripheral area FA due to the disposition of the second portion SC2 is small. The increment can be limited, for example, to be less than or equal to 10 μm.

The first portion SC1 is disposed in a space between a first line group LG1 and a second line group LG2 as in the case of the scanner SC in the first embodiment. The second portion SC2 is disposed between the second switch group G2 and an end portion (an upper end portion in the figure) of a display panel 2.

In addition, the first portion SC1 is located between the first switch group G1 and an end portion of a counter-substrate CT on a terminal area NA side. In the example shown in the figure, the first portion SC1 and the second portion SC2 are opposed to a sealing material 9. However, at least one of the first portion SC1 and the second portion SC2 may be formed inside the sealing material 9 or outside the sealing material 9 so as not to be opposed to the sealing material 9.

The operation of each of the switch groups G1 to G5 in the present embodiment will be described. FIG. 14 shows a state of each of the switch groups G1 to G5 in a touch detection period (second period). The state of each of the switch groups G1 to G5 in a display period is the same as shown in FIG. 6.

The present embodiment differs from the first embodiment in that in the touch detection period, by the second portion SC2 of the scanner SC, a second switch SW2 of a drive electrode TX as a drive target is turned off, and second switches SW2 of the other drive electrodes TX are turned on. In the example of FIG. 14, a drive electrode TX2 is a drive target, the second switch SW2 connected to the drive electrode TX2 is turned off, and the second switches SW2 of the other drive electrodes TX are turned on.

Each of the scanning lines G shown in FIG. 4 crosses the drive electrodes TX1 to TXn. Therefore, coupling noise can be incorporated into the drive electrodes TX which are not drive targets via each of the scanning lines G from the drive electrode TX as a drive target. In the present embodiment, in the touch detection period, a common voltage $V_{COM}$ is applied to the drive electrodes TX which are not drive targets from both end portions of their extending direction. Therefore, the drive electrodes TX which are not drive targets are stabilized by the common voltage $V_{COM}$, and hardly influenced by the above noise via the scanning lines G, etc. The accuracy of touch detection can be thereby increased.

Fourth Embodiment

A fourth embodiment will be described. The present embodiment differs from the first embodiment in the arrangement of fourth switches SW4. The following description will mainly focus on differences from the first embodiment, and the same structures as in the first embodiment will be given the same reference numbers, and explanations thereof may be omitted.

FIG. 15 is a diagram schematically showing a part of one drive electrode TX, switches SW1 to SW5 arranged in the vicinity of the drive electrode TX, etc. In the figure, each of the switches SW1 to SW5 shows a state in which in a touch detection period, a common voltage $V_{COM}$ is applied to the shown drive electrode TX.

In the example of FIG. 15, the drive electrode TX comprises first projections 51 projecting toward a terminal area NA side (a lower side in the figure), second projections 52 projecting toward the opposite side (an upper side in the figure) to the terminal area NA, and a connecting portion 53 connecting tips of the respective first projections 51. For example, the first projections 51 extend to be closer to the terminal area NA side than a high-voltage line 42. For example, the connecting portion 53 is disposed to be closer to the terminal area NA side than the high-voltage line 42, and extends parallel to the high-voltage line 42.

In the present embodiment, the fourth switches SW4 are disposed to be closer to the terminal area NA side than the high-voltage line 42, and connect or disconnect video lines VL and the connecting portion 53 to or from each other. In the touch detection period, the fourth switches SW4 are all turned on. Moreover, in the present embodiment, in the touch detection period, the third switches SW3 are all turned on. Therefore, in the touch detection period, not only signal lines S but also the video lines VL are at the same potential as the drive electrode TX connected via the fourth switches SW4.

In the structure shown in FIG. 9, the same number of fourth switches SW4 as the signal lines S need to be arranged. In contrast, in the structure shown in FIG. 15, it suffices if the same number of fourth switches SW4 as the video lines VL before branching to connect to the third switches SW3 are provided. That is, according to the present embodiment, the number of fourth switches SW4 can be greatly reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

In each of the embodiments, the structure in which a common voltage $V_{COM}$ can be applied to drive electrodes TX from both ends portions in an extending direction of the drive electrodes TX by first switches SW1 and second switches SW2 has been disclosed. However, the second switches SW2 need not be provided, so that the common voltage $V_{COM}$ is applied from only the end portions on the first switches SW1 side.

In addition, in each of the embodiments, the structure in which the drive electrodes TX and signal lines S can be connected at both end portions in the above extending direction by fourth switches SW4 and fifth switches SW5 has been disclosed. However, the fifth switches SW5 need not be provided, so that the drive electrodes TX and the signal lines S are connected at only the end portions on the fourth switches SW4 side. Moreover, both the fourth switches SW4 and fifth switches SW5 need not be provided.

In each of the embodiments, the structure in which a second supply line 40 includes a low-voltage line 41 and a high-voltage line 42, and the first switches SW1 comprise a low-voltage switch SWL and a high-voltage switch SWH connecting the drive electrodes TX to the low-voltage line 41 and the high-voltage line 42, respectively, has been disclosed. The low-voltage line 41 and the high-voltage line 42 are unlikely to be a noise source, because a fixed potential is applied. However, the structure in which a signal which fluctuates in potential between a first voltage $V_{TPL}$ and a second voltage $V_{TPH}$ is supplied by one line of the second supply line 40, and the first switches SW1 comprise a switch which alternately connects the second supply line 40 and the first supply line 30 to the drive electrode TX may be adopted.

What is claimed is:

1. A display device comprising:
   pixel electrodes formed in a display area;
   drive electrodes opposed to the pixel electrodes;
   a first line group and a second line group formed in a non-display area outside the display area, and configured to transmit a video signal supplied to the pixel electrodes;
   a first switch configured to apply a predetermined voltage for image display or a drive signal for detecting an object in contact with or in proximity to the display area to each of the drive electrodes; and
   a scanner configured to control the first switch;
   wherein the first line group and the second line group are disposed with a space between the first line group and the second line group, and
   at least a part of the scanner is disposed in the space between the first line group and the second line group.

2. The display device of claim 1, wherein the scanner includes a first portion and a second portion,
   the first portion is disposed in the space, and
   the second portion is disposed between the first line group and an end portion of the display device.

3. The display device of claim 1, wherein the scanner includes a first portion, a second portion, and a third portion,
   the first portion is disposed in the space,
   the second portion is disposed between the first line group and a first end portion of the display device, and
   the third portion is disposed between the second line group and a second end portion of the display device.

4. The display device of claim 1, wherein the scanner includes a first portion and a second portion,
   the first portion is disposed in the space, and
   the second portion is disposed on an opposite side to the first portion with the display area sandwiched between the first portion and the second portion.

5. The display device of claim 4, further comprising a second switch configured to connect or disconnect the drive electrodes to or from a first supply line to which the predetermined voltage is applied,
   wherein the first switch is disposed on one side of the display area,
   the second switch is disposed on an opposite side to the first switch with the display area sandwiched between the first switch and the second switch,
   the first portion is configured to control the first switch, and
   the second portion is configured to control the second switch.

6. The display device of claim 1, comprising a first substrate, a second substrate smaller in shape than the first substrate, a sealing material formed between the first substrate and the second substrate, and a liquid crystal layer enclosed between the first substrate and the second substrate by the sealing material, and
   the scanner is disposed in an area where the first substrate and the second substrate are opposed.

7. The display device of claim 6, wherein the scanner is provided to be closer to the liquid crystal layer side than an outer periphery of the sealing material.

8. The display device of claim 6, comprising an unopposed area where the first substrate and the second substrate are not opposed,
   wherein each of the drive electrodes is arranged in a first direction parallel to one side on the unopposed area side of the display area, and extends in a second direction crossing the first direction, and
   the first switch is disposed along the one side.

9. A display device comprising:
   a display panel comprising a display area where pixel electrodes are formed,
   a drive electrode opposed to the pixel electrodes,
   a first switch disposed in the display panel and configured to switch a target to which the drive electrode is connected between a first supply line configured to apply a predetermined voltage for image display and a second supply line configured to supply a drive signal for detecting an object in contact with or in proximity to the display area,
   a second switch disposed in the display panel in an area on an opposite side to the first switch with the display area sandwiched between the first switch and the second switch, and configured to connect or disconnect the drive electrode to or from the first supply line, and
   a detection module configured to detect the object in contact with or in proximity to the display area, when the drive signal is supplied to the drive electrode.

10. The display device of claim 9, comprising drive electrodes including the drive electrode, first switches including the first switch, and second switches including the second switch, the first switches and the second switches being connected to the drive electrodes,
    wherein in a first period in which an image is displayed, the first switches connect the respective drive electrodes to the first supply line, and the second switches connect the respective drive electrodes to the first supply line, and
    in a second period in which the object in contact with or in proximity to the display area is detected, the first switches connect at least one of the drive electrodes which is a drive target to the second supply line, and connect a rest of the drive electrodes to the first supply line, and the second switches disconnect the respective drive electrodes from the first supply line.

11. The display device of claim 9, comprising drive electrodes including the drive electrode, first switches including the first switch, and second switches including the second switch, the first switches and the second switches being connected to the drive electrodes,
wherein in a first period in which an image is displayed, the first switches connect the respective drive electrodes to the first supply line, and the second switches connect the respective drive electrodes to the first supply line, and
in a second period in which the object in contact with or in proximity to the display area is detected, the first switches connect at least one of the drive electrodes which is a drive target to the second supply line, and connect a rest of the drive electrodes to the first supply line, and the second switches disconnect the at least one of the drive electrodes which is the drive target from the first supply line and connect the rest of the drive electrodes to the first supply line.

12. The display device of claim 9, wherein the display panel comprises a first substrate, a second substrate smaller in shape than the first substrate, and a liquid crystal layer enclosed between the first substrate and the second substrate, and includes an unopposed area where the first substrate and the second substrate are not opposed, and
the first switch is disposed between the unopposed area and the display area.

13. The display device of claim 9, further comprising:
a driver module configured to supply a video signal to a signal line connected to each of the pixel electrodes;
a third switch configured to connect or disconnect the signal line to or from the driver module; and
a fourth switch configured to connect or disconnect the signal line to or from the drive electrode,
wherein in a first period in which an image is displayed, the third switch connects the signal line to the driver module, and the fourth switch disconnects the signal line from the drive electrode, and
in a second period in which the object in contact with or in proximity to the display area is detected, the third switch disconnects the signal line from the driver module, and the fourth switch connects the signal line to the drive electrode.

14. The display device of claim 13, wherein the second supply line includes a low-voltage line to which a first voltage is applied and a high-voltage line to which a second voltage greater than the first voltage is applied, and
the first switch is configured to generate the drive signal fluctuating between the first voltage and the second voltage by alternately switching the target to which the drive electrode is connected between the low-voltage line and the high-voltage line.

15. The display device of claim 14, wherein the display panel comprises a first substrate, a second substrate smaller in shape than the first substrate, and a liquid crystal layer enclosed between the first substrate and the second substrate, and includes an unopposed area where the first substrate and the second substrate are not opposed,
the third switch is disposed between the unopposed area and the display area, and
the low-voltage line and the high-voltage line pass through a space between the third switch and the unopposed area.

16. The display device of claim 15, wherein the driver module is disposed in the unopposed area, and
the first switch is disposed between the third switch and the driver module.

17. A display device including a display area in which pixel electrodes are formed and a non-display area,
wherein in the display area, a drive electrode opposed to the pixel electrodes and a detection electrode opposed to the drive electrode are provided,
in the non-display area, a first switch configured to connect a first supply line to which a common voltage is applied to the drive electrode, a second switch configured to connect a second supply line to which a first drive voltage is applied to the drive electrode, a third switch configured to connect a third supply line to which a second drive voltage greater than the first drive voltage is applied to the drive electrode, a first control line configured to control the second switch, a second control line configured to control the third switch, and a detection line connected to the detection electrode are provided, and
the second switch and the third switch are disposed between the detection line and the display area.

18. The display device of claim 17, comprising a scanner configured to control the second switch and the third switch,
wherein the detection line passes through a space between the scanner and the first switch.

19. The display device of claim 17, wherein the first control line and the second control line cross the detection line.

20. The display device of claim 17, wherein a control signal supplied to the first control line is in antiphase to a control signal supplied to the second control line.

* * * * *